May 3, 1932.                    F. M. CARROLL                    1,856,411
                                COMPUTING SCALE
                         Filed Oct. 22, 1927        3 Sheets-Sheet 1
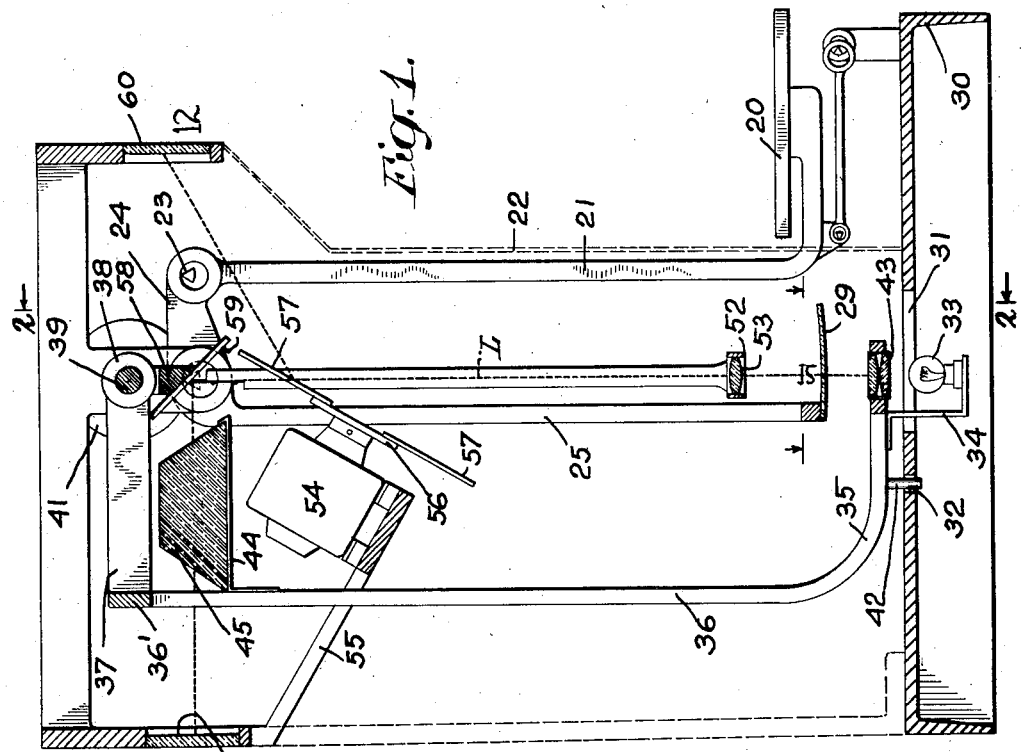
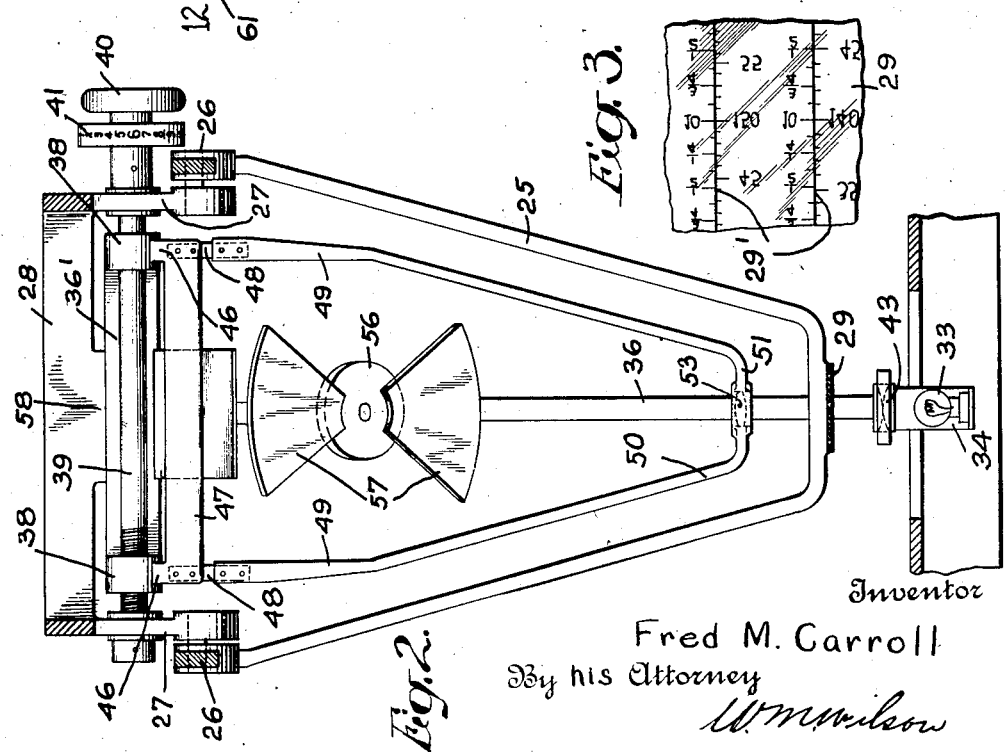
Inventor
Fred M. Carroll
By his Attorney

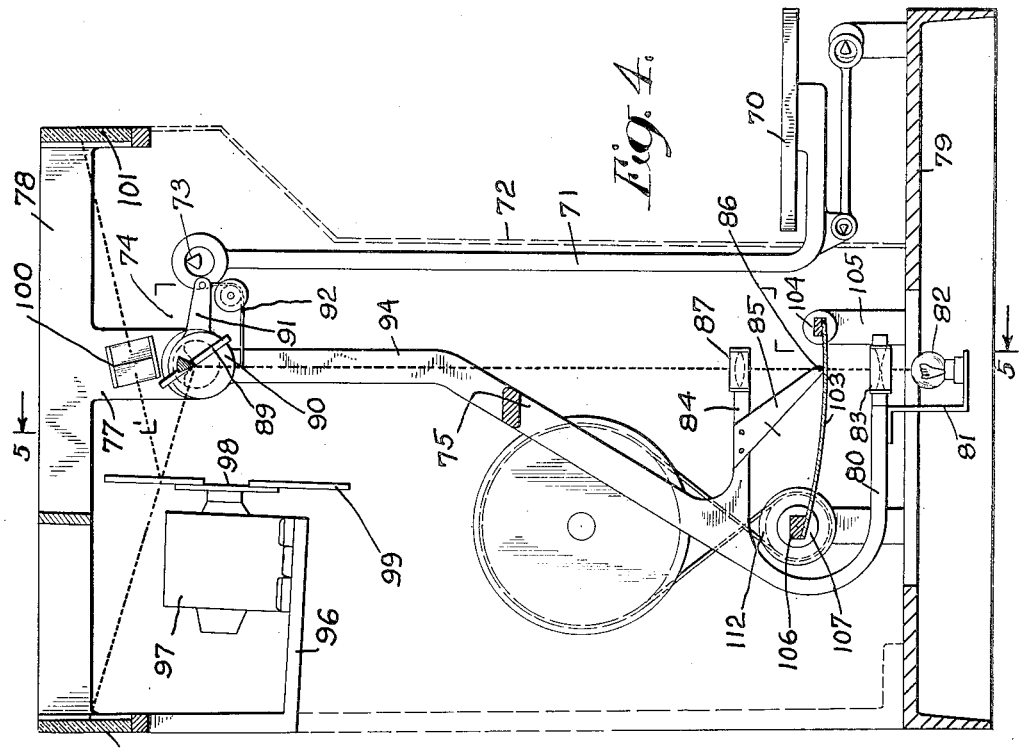
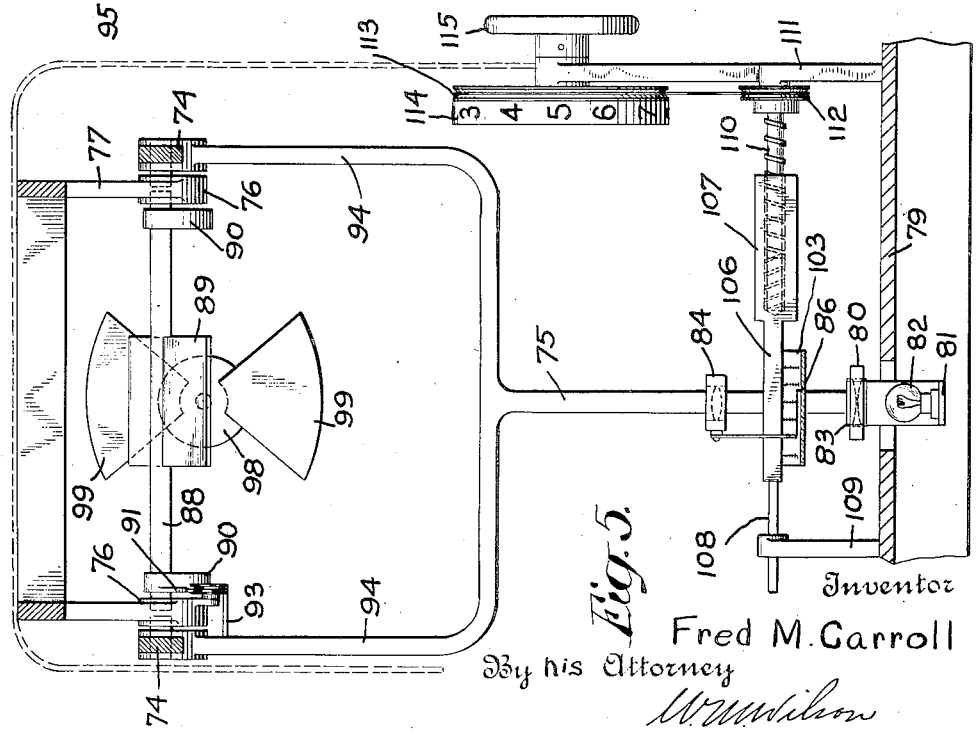

May 3, 1932.  F. M. CARROLL  1,856,411
COMPUTING SCALE
Filed Oct. 22, 1927  3 Sheets-Sheet 3

Inventor
Fred M. Carroll
By his Attorney

Patented May 3, 1932

1,856,411

UNITED STATES PATENT OFFICE

FRED M. CARROLL, OF YONKERS, NEW YORK, ASSIGNOR TO DAYTON SCALE COMPANY, OF DAYTON, OHIO, A CORPORATION OF NEW JERSEY

COMPUTING SCALE

Application filed October 22, 1927. Serial No. 227,987.

This invention relates to weighing scales of the computing type. It is the practice in the computing scale art to provide the scale chart with a plurality of graduated scales, each corresponding to a different rate or price per unit weight. In order to accommodate an extensive range of rates, the graduations and corresponding rate indications must be very small. Further, it is also usual to inscribe the chart with the corresponding weight indications alongside the rate indications. This results in making all the indications on the chart extremely small. It is also desirable in computing scales, to show the indication on both the customer's and the merchant's side of the scale. This has previously required the use of two sets of graduations, one a duplicate of the other, making the graduations on the chart even more minute in order to accommodate the same number of scales.

One object of the present invention is to provide means for displaying two images of a single indication on the chart.

Another object of this invention is to display an image of a chart designation alternately on a plurality of screens.

Another object of this invention is to obtain a single image of a chart indication and direct said image in one or more directions to be displayed upon screens.

Other objects and advantages of this invention will be apparent from the following description, in which reference is had to the accompanying drawings, illustrating the preferred embodiments of my invention and wherein similar reference numerals designate similar parts throughout the drawings wherein:

Fig. 1 is a side sectional view through one modification of the invention.

Fig. 2 is a section on line 2—2 of Fig. 1.

Fig. 3 is a top detail view of the chart.

Fig. 4 is a side section through another modification of the invention.

Fig. 5 is a section on line 5—5 of Fig. 4.

Figure 6:
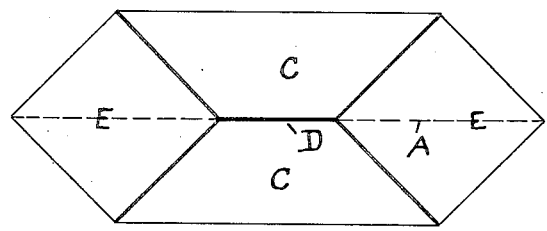
Fig. 6 is a top view of the prismatic lens used in the modification illustrated in Fig. 1.
Figure 7:
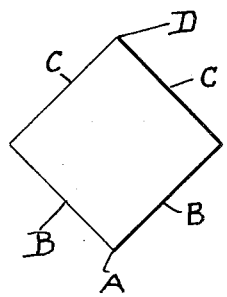
Fig. 7 is a view of the prismatic lens looking at it in the direction of the arrows marking section line 2—2.
Figure 8:
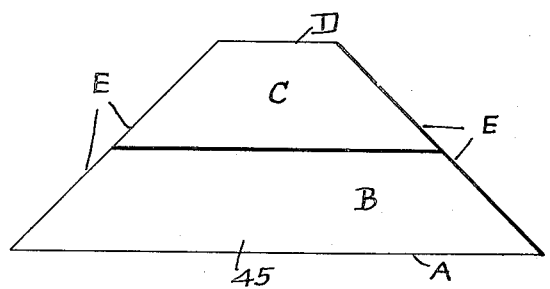
Fig. 8 is a side view of the prismatic lens.
Figure 9:
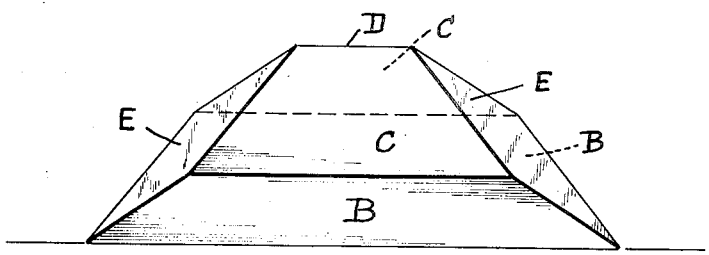
Fig. 9 is a view similar to Fig. 8 with the lens tipped toward the observer.

In the modification shown in Figs. 1 and 2, the scale comprises a chart movable with the pendulum and scanned by a stationary optical indicating system. In detail, it comprises a platform 20 upon which the object to be weighed is placed. Integral with the platform are links 21 extending vertically within a housing 22 and suspended from knife edge pivots 23 fixed on arms 24 of a bifurcated pendulum or weight offsetting beam 25. The pendulum is hung from knife edges 26 fixed in depending arms 27 of a stationary frame 28 fixed to the sides of housing 22. The lower end of the pendulum carries in fixed position a scale chart 29 of transparent material having a plurality of rows 29' (Fig. 3) of different rates thereon parallel to the direction of movement of the pendulum. The housing 22 rests on a base 30 which has cut in its top an aperture 31 and a slot 32. Extending into the base 30 within the aperture 31 is a source of light 33 supported on a bracket 34 fixed to the lower horizontal arm 35 of a member 36 depending from a cross beam 36'. Beam 36' has two arms 37 extending from its ends parallel to the lower arm 35. The free ends of the arms 37 are formed as internally threaded sleeves 38 which have a threaded connection with a shaft 39 journalled in the sides of housing 22. At one end the shaft 39 carries a hand-wheel 40 and an index wheel 41 on the periphery of which is marked the various rates of the chart 29. The lower arm 35 of member 36 has a pin 42 movable within and along slot 32 of the base 30. At its extremity arm 35 carries a condenser lens 43. Near its upper end, member 36 has attached to it a bracket 44 designed to hold a prismatic lens 45 which acts to completely reverse an image horizontally and vertically. The lens is shown in detail in Figs. 6 to 9. It is formed with a long edge A constituting the common base of two equal right angularly disposed trapezoidal sides B, the upper edges of which form the bases of trapezoidal sides C having a common upper edge D. The faces E are disposed at an angle at 45° to the sides B. In position in bracket 44 the lens rests on its long edge A with the sides at an angle of 45° to the vertical and parallel to the direction of a beam from mirror 59, Figs. 6, 7 and 8, showing respectively top, front and side views of the lens when in position. Sleeves 38 of arms 37 have depending extensions 46 integrally connected by a beam 47. One leaf of a hinge 48 is fixed to each extension and the other leaf of the hinge is fixed to the upper ends of arms 49 of a bifurcated member 50. The arms 49 converge and are connected by a base portion 51 which has an aperture 52 in which is mounted a projecting lens 53. Light bulb 33, condenser lens 43 and projecting lens 53 are on the same center line. By means of hand wheel 40 which is turned till the desired rate is indicated on wheel 41, the shaft 39 is rotated to effect through its threaded connection with sleeves 38 of member 36 a movement of said member parallel to the shaft, the member being guided at its lower end by means of pin 42 in slot 32. The shaft being transverse to the rate rows, the member 36 in moving along the shaft will move across the rate rows, the extent of its movement being determined by indicating wheel 41 so that bulb 33 and lenses 43 and 53 will be in line with the rate row whose number is indicated on wheel 41.

A motor 54 is attached to a base plate 55 fixed at an angle to the housing 22. The end of the motor shaft is provided with a disc 56 which carries at diametrically opposite points two similar reflectors 57 spaced apart an angular distance approximately equal to the arc of their periphery. A mirror 59 is fixed at an angle of about 45° to a plate 58 integrally depending from the center of fixed frame 28.

In operation, the rate row of the object to be weighed is selected by turning hand wheel 40 to position the projecting system consisting of lamp 33 and lenses 43 and 53 in line with said rate row on the chart. The motor 54 is set in motion and the object to be weighed is placed on platform 20 which through extension 21 effects an angular movement of the pendulum 25. Chart 29 on the pendulum moves with it in the direction in which the graduation run in a rate row and when the pendulum comes to rest one of said graduations in the selected rate row is in the path of a beam of light L emitted from bulb 33. The beam of light passes through condensing lens 43, the transparent chart 29, and projecting lens 53 which reverses the image in both horizontal and vertical directions. In the course of their rotation, reflectors 57 intercept the beam carrying the image and reflect it on a screen 60 mounted in the housing 22 on the side thereof in view of the clerk. While the spaces between the mirrors 57 are traveling past the projected image beam, the beam will obviously not be intercepted by mirrors 57 but will pass through said spaces and be intercepted by mirror 59. The latter mirror will reflect the image through prismatic lens 45 which reverses the image and projects it on screen 61 mounted in the housing on a side thereof opposite to screen 60. The screen 61 is in view of the customer. Both the merchant and customer will thus be able to see the image of the rate and weight readings corresponding to the price and weight of the article on the scale platform.

In the modification shown in Figs. 4 and 5, the optical reading system is movable with the pendulum and the scale chart is stationary. The scale comprises a platform 70 having vertical links 71 extending within the housing 72 and suspended at their upper ends from knife edges 73 fixed in the arms 74 of a pendulum 75. The pendulum is fulcrumed by means of the usual knife edges in bearings 76 formed in the ends of arms 77 of the fixed frame 78. The end of the pendulum terminates in a horizontal arm 80 on which is fixed a bracket 81 supporting a lamp 82. Mounted in the end of the arm 80 above lamp 82 is a condenser lens 83. An arm 84 integrally extending from the pendulum 75 in the same direction as arm 80 has fastened to it a plate 85 in the end of which is mounted at right angles thereto a hair line 86. The end of arm 84 has an aperture in which is mounted a reversing lens 87 in line with lens 83 and lamp 82.

A shaft 88 is fulcrumed in bearings 76 in alignment with the center of oscillation of the pendulum likewise suspended in said bearings. Attached to the shaft 88 intermediate its ends is a mirror 89 normally tipped at an angle of about 45°. Near its ends, the shaft carries discs 90 one of which has an arm 91 integrally extending therefrom at right angles. Attached to said arm near its end is one end of a wire 92 the other end of which is attached to a pin 93 fixed in the sides of one of the furcations 94 of the pendulum. The ratio of the distances of attachment of the wire to the pendulum and the arm 91 is 1 to 2. The points of attachment obviously move equal distances upon movement of the pendulum. If the pendulum oscillates through on angle $\theta$, the arm 91 and the shaft 88 to which it is fixed will oscillate through half of angle $\theta$, since for the same distance of movement of the ends of two or more radii the angle subtended is proportional inversely to the length of the radii. The mirror 89 fixed on shaft 88 will therefore move through half the angular distance that the pendulum moves through. It may be readily demonstrated that if a beam cast on a mirror moves from one position to another through an angle $\theta$, that the beam reflected from the mirror remains fixed in direction if the mirror be moved through half of angle $\theta$. As explained above, mirror 89 moves through half the angular distance $\theta$ of pendulum 75. Hence a beam from lamp 82 fixed to the pendulum and moving with it will always be reflected from mirror 89 in the same direction, thus the image carried by the beam will be always in the same location on the screen 95 which is in the line of sight of the customer.

A bracket 96 rigid with the housing supports a motor 97, to the shaft of which is fixed a disc 98. The disc carries a pair of mirrors 99 separated by a wide space. The rotating mirror structure just described is similar to that used in the previously described modification shown in Figs. 1 and 2. During their rotation, mirrors 99 intercept a beam of light L' from the lamp 82 and reflect it through a triangular prismatic lens 100 which reverses the image horizontally and casts it upon a screen 101 viewed by the merchant. When the space between the mirrors crosses the beam of light, the beam is not intercepted but passes to mirror 89 which reflects the image upon screen 95. Thus if the motor shaft be rapidly rotated, a series of images of a scale reading carried by beam L' will be intermittently but in rapid succession thrown alternately on both screens.

The optical system and weight offsetting mechanism so far described in this modification cooperates with a transparent chart 103 having a plurality of different rate and weight rows arranged parallel to the direction of movement of the pendulum as in the previous modification. The chart is attached at one end to a rod 104 slidably mounted in an opening of standard 105 supported on base 79. The other end of the chart is attached to a rod 106 terminating in an internally threaded sleeve portion 107 and having a portion 108 slidably supported in standard 109 supported on base 79. A threaded shaft 110 fits into sleeve 107 and cooperates therewith so that upon rotation of the shaft, the rod 106 and the chart carried by said rod moves in the direction of its length. The rate rows on the chart thus move across the optical reading system comprising lamp 82 and lenses 80 and 84. Shaft 110 is journalled in a standard 111 supported on the base 79 and is provided with a pulley 112 having a driving connection with a pulley 113 also journalled in said standard 111. Fixed to the pulley 113 is a rate indicating wheel 114 in which is marked the various rates on the scale chart. The pulley 113 is rotated by means of a hand wheel 115.

In operation, the hand wheel is rotated till the price and scale rate desired to be scanned by the beam of light from the lamp 82 is indicated on wheel 114. In accordance with the indication on said wheel 114, the rate row indicated will be positioned in a vertical plane passing through the center of lenses 83 and 87 and perpendicular to hair line 86. The motor 97 is then set in motion and the article to be weighed placed on platform 70 causing the pendulum 75 together with the lamp 82 and lenses 83 and 87 to swing along the selected rate row on the scale chart 103. When the pendulum ceases moving the beam of light L' is focused on a reading in the selected rate row. The reading, with the hair line 86 serving as an index line is reflected from rotating mirrors 99 onto screen 101 and from mirror 89 upon screen 95. An image of the weight and rate reading is thus presented alternately to both the customer and merchant, as in the previous modification.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

What is claimed is:

1. In a computing scale, in combination, a load support, a transparent chart connected to said support to be movable in response to a load carried by said support, said chart bearing a series of graduations, means on one side of the chart for projecting a graduation therefrom corresponding to the load on the support, and a plurality of means on the other side of the chart for alternately intercepting and reflecting the image of said projected graduation.

2. In a weighing scale, in combination, weighing mechanism, a chart cooperating therewith having a series of designations, means for directing a beam of light carrying an image of said designations in one direction, and means for alternately directing said beam of light carrying said image in different directions.

3. In a weighing scale, in combination, weighing mechanism, a chart cooperating therewith, said chart having a series of designations, means for obtaining a single beam of light carrying an image of said designations, means successively acting upon said beam of light to successively direct it in different paths, and a plurality of screens each in one of said paths for intercepting and displaying the image carried by said beam.

4. In a weighing scale, in combination, weighing mechanism, a transparent chart cooperating therewith, said chart having a series of designations, a projector for projecting a magnified image of said designations in one direction, means intercepting said projected image to direct it to one side of the scale, and other means for intercepting the projected image to direct it to the opposite side.

5. A scale comprising a chart, a projector cooperating with said chart to project different portions thereof, a load support having means for actuating said chart and projector relatively to position a portion of the chart corresponding to the load on the support for projection by said projector, and means for alternately directing the projection of said chat by the projector in different directions.

6. A scale comprising a chart, a projector cooperating with said chart to project portions thereof, a load support having means for actuating said chart and projector relatively to position a portion of the chart corresponding to the load on the support for projection by said projector, a plurality of screens, and means for alternately directing the projection of said chart by the projector upon each of said screens.

7. A scale comprising a chart, a projector cooperating with said chart to project portions thereof, a load support having means for actuating said chart and projector relatively to position a portion of the chart corresponding to the load on the support for projection by said projector, and means for alternately intercepting the projection of said chart by the projector.

8. In a scale, a transparent chart, means for projecting a beam of light through said chart, a load support having connections for actuating said chart and projecting means relatively to position a portion of the chart corresponding to the load on the support for projection by said means, a plurality of screens, and a plurality of opaque, optical, reflecting elements, each for directing the beam of light after it has been projected through the chart upon one of said screens.

9. In a scale, a transparent chart, a projector and a load support having means for actuating said projector and chart relatively to position a portion of said chart corresponding to the load on the support for projection by said means, said projector including means for directing a single beam of light through said chart and means for alternately directing said beam in different directions.

10. A device comprising a housing, a screen fixed thereto, a chart within said housing, means for directing a beam of light upon said chart to project a beam therefrom carrying an image of a portion of said chart, and means for intermittently intercepting the image carrying beam and directing it upon said screen.

11. A device comprising a housing, a screen fixed thereto, a chart within said housing, means for directing a single beam of light upon said chart to provide a beam carrying an image of a portion of said chart, and means movably mounted within said housing for intermittently intercepting the image carrying beam and directing it upon said screen.

12. A device comprising a housing, a plurality of screens fixed thereto, a chart within said housing, means for directing a single beam of light upon said chart to provide a beam carrying an image of a portion of said chart, and means located inside the housing for directing said image carrying beam upon said screens.

13. A device comprising a frame, a chart movably carried thereby, a housing for the chart, load supporting means for actuating said chart, said chart being provided with a plurality of series of different graduations, each series based on a different multiple of the load on the support, means for selectively directing a single beam upon said chart to thereby provide a beam carrying an image of a graduation from one of the series, a plurality of screens, and means located inside said housing for directing said image carrying beam upon each of said screens.

14. In combination, a casing, a chart mounted in the interior of the casing, a plurality of image beam interceptors, means located in the interior of the housing cooperating with the chart for obtaining a single image beam of a portion of the chart, means located in the interior of the chart housing for directing the image beam to one of the image interceptors, and means located in the interior of the chart housing for directing the image beam to another of the image interceptors.

In testimony whereof I hereto affix my signature.

FRED M. CARROLL.